(12) United States Patent
Bertelli

(10) Patent No.: US 8,550,112 B2
(45) Date of Patent: Oct. 8, 2013

(54) MULTIFUNCTIONAL SAFETY VALVE DEVICE WITH INCORPORATED PROPORTIONAL PRESSURE REGULATOR

(75) Inventor: Pierluigi Bertelli, Bardolino (IT)

(73) Assignee: Bertelli & Partners S.R.L., Angiari (IT)

( * ) Notice: Subject to any disclaimer, the term of this patent is extended or adjusted under 35 U.S.C. 154(b) by 491 days.

(21) Appl. No.: 12/738,996

(22) PCT Filed: Oct. 22, 2007

(86) PCT No.: PCT/IT2007/000734
§ 371 (c)(1),
(2), (4) Date: Jun. 24, 2010

(87) PCT Pub. No.: WO2009/054009
PCT Pub. Date: Apr. 30, 2009

(65) Prior Publication Data
US 2010/0300553 A1 Dec. 2, 2010

(51) Int. Cl.
*F16K 31/12* (2006.01)
(52) U.S. Cl.
USPC ............ 137/487.5; 137/494; 137/505.12; 137/505.13; 137/506; 137/613; 251/129.17
(58) Field of Classification Search
USPC .......... 137/487.5, 613, 494, 505.12, 505.13, 137/506; 251/129.15, 129.17
See application file for complete search history.

(56) References Cited

U.S. PATENT DOCUMENTS

| | | | |
|---|---|---|---|
| 4,424,830 A * | 1/1984 | Arnsperger et al. | 137/613 |
| 5,307,774 A * | 5/1994 | Hammer | 123/339.27 |
| 6,003,544 A | 12/1999 | Turrin et al. | |
| 6,957,663 B2 * | 10/2005 | Hirota et al. | 137/613 |
| 2002/0029812 A1 * | 3/2002 | Hotta et al. | 137/613 |
| 2003/0000584 A1 * | 1/2003 | Thordarson et al. | 137/613 |
| 2004/0011411 A1 * | 1/2004 | Thordarson et al. | 137/613 |
| 2004/0069355 A1 * | 4/2004 | Sollier | 137/613 |
| 2005/0022884 A1 | 2/2005 | Takeda | |
| 2006/0180783 A1 * | 8/2006 | Tackes et al. | 251/129.15 |
| 2007/0131286 A1 * | 6/2007 | Benda et al. | 137/554 |

FOREIGN PATENT DOCUMENTS

| | | |
|---|---|---|
| DE | 2330486 A1 | 1/1975 |
| DE | 2608920 A1 | 9/1977 |
| EP | 0669499 A1 * | 8/1995 |
| EP | 0800039 A1 | 8/1997 |
| EP | 1503122 A1 | 2/2005 |

(Continued)

*Primary Examiner* — Craig Schneider
*Assistant Examiner* — Jessica Cahill
(74) *Attorney, Agent, or Firm* — Novak Druce Connolly Bove + Quigg LLP

(57) ABSTRACT

Multifunctional safety valve device with proportional pressure regulator, for line feeding aeriform fluid to a user, including a body defining a fluid or gas conduit connected to a gas feed line and a gas delivering line. The conduit has first and second passages intercepted by respective first and second valving elements. The second element downstream of the first for gas pressure regulating and modulating. The valving elements operated by electromagnetic actuators and urged closed at least by a spring. The second element cooperating with a membrane subjected to gas pressure to urge the second element closed. The membrane has, subjected to gas pressure, a surface larger than that of the second element subjected to the same pressure, to maintain the second element closed. The second element presenting, downstream of the second passage, a portion with a flexible rim arranged to seal the second passage when intercepted by the second element.

26 Claims, 13 Drawing Sheets

(56) References Cited

FOREIGN PATENT DOCUMENTS

| | | | |
|---|---|---|---|
| GB | 2107846 A | | 5/1983 |
| JP | 58128580 A | | 8/1983 |
| JP | 61031778 A | * | 2/1986 |
| JP | 62248914 A | | 10/1987 |
| WO | 02070936 A | | 9/2002 |
| WO | WO 2004088206 A1 | * | 10/2004 |
| WO | WO 2005088194 A1 | * | 9/2005 |
| WO | 2006003684 A1 | | 1/2006 |
| WO | WO 2007019910 A1 | * | 2/2007 |

* cited by examiner

MULTIFUNCTIONAL SAFETY VALVE DEVICE WITH INCORPORATED PROPORTIONAL PRESSURE REGULATOR

CROSS-REFERENCE TO RELATED APPLICATION

This application is a §371 National Stage Application of International Application No. PCT/IT2007/000734, filed on 22 Oct. 2007.

The present invention relates to a multifunctional safety valve device with incorporated proportional pressure regulator positioned in a line feeding an aeriform fluid to a user, in accordance with the introduction to the main claim. It has long been known to use such a multifunctional device with pressure regulator in feeding an aeriform fluid to a user, such as a gas to a boiler. This device (or generally regulator) usually comprises a body in which an internal conduit is provided for connection to a gas intake line and to a delivery line for feeding the gas to the user.

This conduit comprises two passages or constrictions in succession, in each of which a valve member is positioned provided with a valving element arranged to restrict or intercept, i.e. completely close, the corresponding passage on the basis of the gas required by the user. This valving element is usually subjected to a spring which forces it into a position of passage closure. The valving element is also subjected to the action of an electromagnetic actuator which moves it relative to the passage to enable it to open or throttle the gas flow towards the user, according to requirements. This action is achieved by suitably controlling the electric current to the electromagnetic actuator which, on the basis thereof, moves the valving element relative to the corresponding passage.

More specifically, it is known for example from EP1608912 and WO2006/003684 to form this body such that it presents the two passages within separating walls or baffles provided in the gas conduit, said baffles defining a plurality of chambers connected together in pairs by said apertures; finally a first chamber is connected to the gas intake line, the last chamber being connected in the gas flow direction to a line feeding the gas to the user. A first valving element is positioned in the first passage (or aperture within the baffle) to act as an ON-OFF valve, a second valving element (of a second valve member) operating in the second passage, its selectively controlled movement within the corresponding passage regulating the gas flow through it. This movement is obtained by the electromagnetic actuator. WO2006/003684 describes the presence of a membrane functionally associated with the actuator of the second valve member acting as a pressure regulator. This membrane is subjected, as is the valving element, to the pressure of the gas in the line entering the body of the known multifunctional device. Specifically, the surface of the membrane subjected to the gas pressure is equivalent to that of the valving element subjected to the said gas such that the resultant of said forces is substantially zero, hence said resultant has no effect on the balance of the forces acting on the pressure regulator.

This solution hence requires the actuator of the second valve to be suitably designed to ensure effective closure of the valving element after each opening, independently of the action of the gas forces acting on the membrane and on the valving element. Moreover none of the aforesaid prior patents (in which a direct actuator, i.e. without levers, is used, which is of low power or energy consumption and with low thrust force) describes a valving element capable of sealing against the passage or aperture on which it is located, when in the closed position, such as to ensures effective closure of this passage when no gas flow is required through it.

Finally, the said prior patents comprise a mechanically adjustable gas bypass which bypasses the second valve member, to enable minimum gas flow to the user. This solution is costly.

The electromagnetic actuator used in currently known solutions comprises a coil or electric winding connected to a electric signal feed circuit. The coil, contained in an armour surround, defines a chamber within which a movable core or member moves, connected at its free end to the valving element either directly or preferably via an interconnection rod.

With particular reference to the actuator of the second valve member acting as the pressure regulator, in known solutions there is the problem that when the spring loses its characteristic, there is no compensation for this during the valving element opening. The result is that, with the passage of time, the valve member operating as the pressure regulator operates incorrectly.

Moreover, known multifunctional devices with a pressure regulator are often of difficult and complicated assembly, especially with regard to the second valve member operating as the effective pressure regulator and modulator.

In addition, as the electric feed is at 230 V d.c. (rectified voltage) and 220 V a.c., present regulations require adequate insulation against environmental conditions (moisture), with consequent high implementation costs; the device has also to be earthed, with further component and assembly costs.

Furthermore, with electric feed at 230 V d.c. (rectified voltage), the absorbed powers are high (typically 15 W), requiring the use of conductors of very small cross-section (e.g. 0.06 mm) with consequent corrosion problems by electrolytic effect, these not being visible during testing but emerging with time.

Additionally, electric feed is of ON-OFF type, generating a noise problem which is resolved using sometimes costly damping.

In addition to this, in the case of electric feed at 220 V a.c., this takes place in ON-OFF manner generating both noise and high component stress; to obviate these drawbacks, difficult high-cost solutions are used: for example the components are immersed in an oil bath and suitably sealed. In all cases, electrical consumption remains high.

An object of the present invention is to provide multifunctional devices with incorporated proportional pressure regulator which represent an improvement over known types.

A particular object of the invention is to provide a multifunctional device of the stated type the operation of which is constant and reliable with time.

Another object is to provide a multifunctional device of the stated type which is of simpler assembly than similar known types and hence producible in a manner ensuring high reliability and quality repeatability in assembly.

A further object is to provide a multifunctional device of the stated type presenting low voltage actuators powered at 24 V d.c. and separated from the mains voltage, with low maximum absorbed powers (<5 W); this eliminates corrosion by electrolytic effect and enables conductors of large cross-section to be used (e.g. 0.18 mm). This solution eliminates the requirement for insulation and earthing, the device production hence being simplified with consequent reduction in component and assembly costs. The coil EV1 is powered via a ramp to maximum power followed by reduction to a maintenance voltage (<2 W); this electrical feed results in a reduction in component mechanical stress, noise elimination and energy saving.

A further object is to provide a multifunctional device of the stated type in which no bypass conduit is provided and no mechanical adjustment of the valve member acting as pressure regulator and modulator is required, although able to maintain minimum and maximum electronic regulation within the passage intercepted by the valving element of this member.

These and other objects which will be apparent to the expert of the art are attained by a multifunctional device with incorporated proportional pressure regulator in accordance with the accompanying claims.

The present invention will be more apparent from the accompanying drawings, which are provided by way of non-limiting example and in which.

Figure 9:
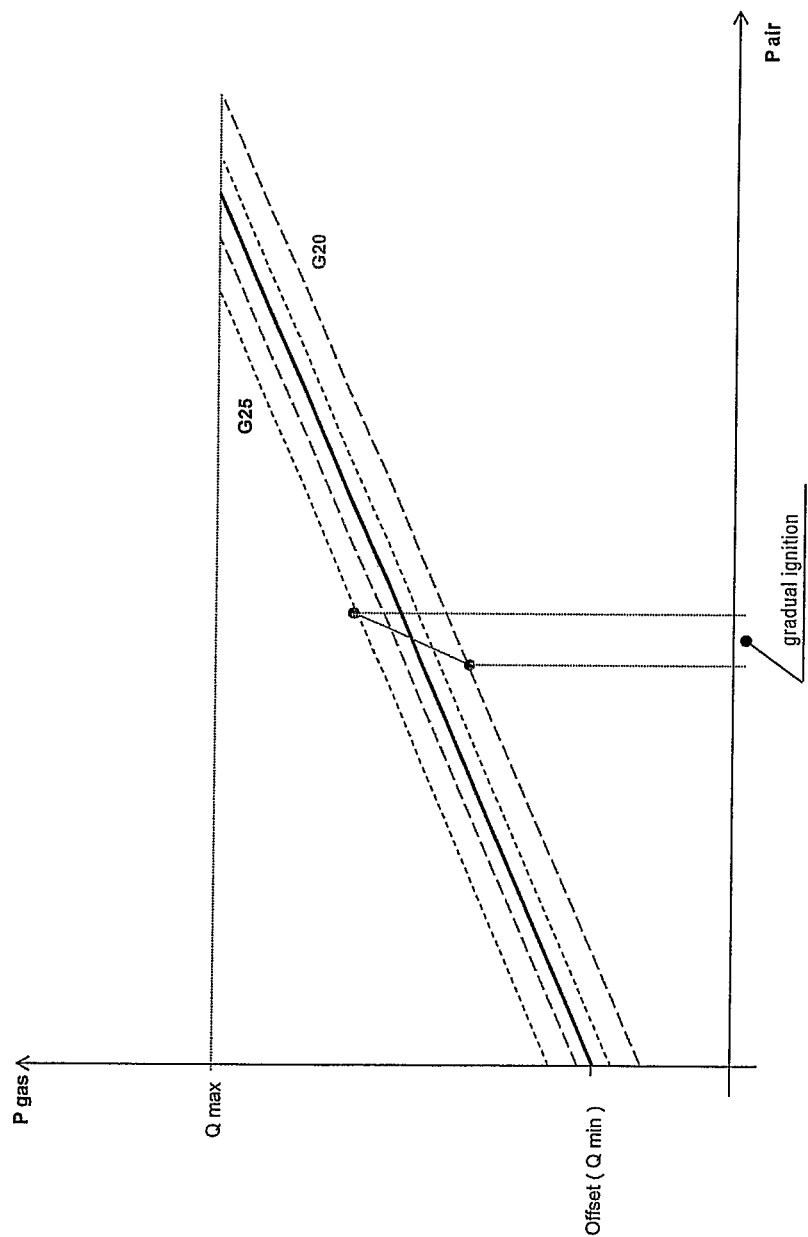
Figure 10:
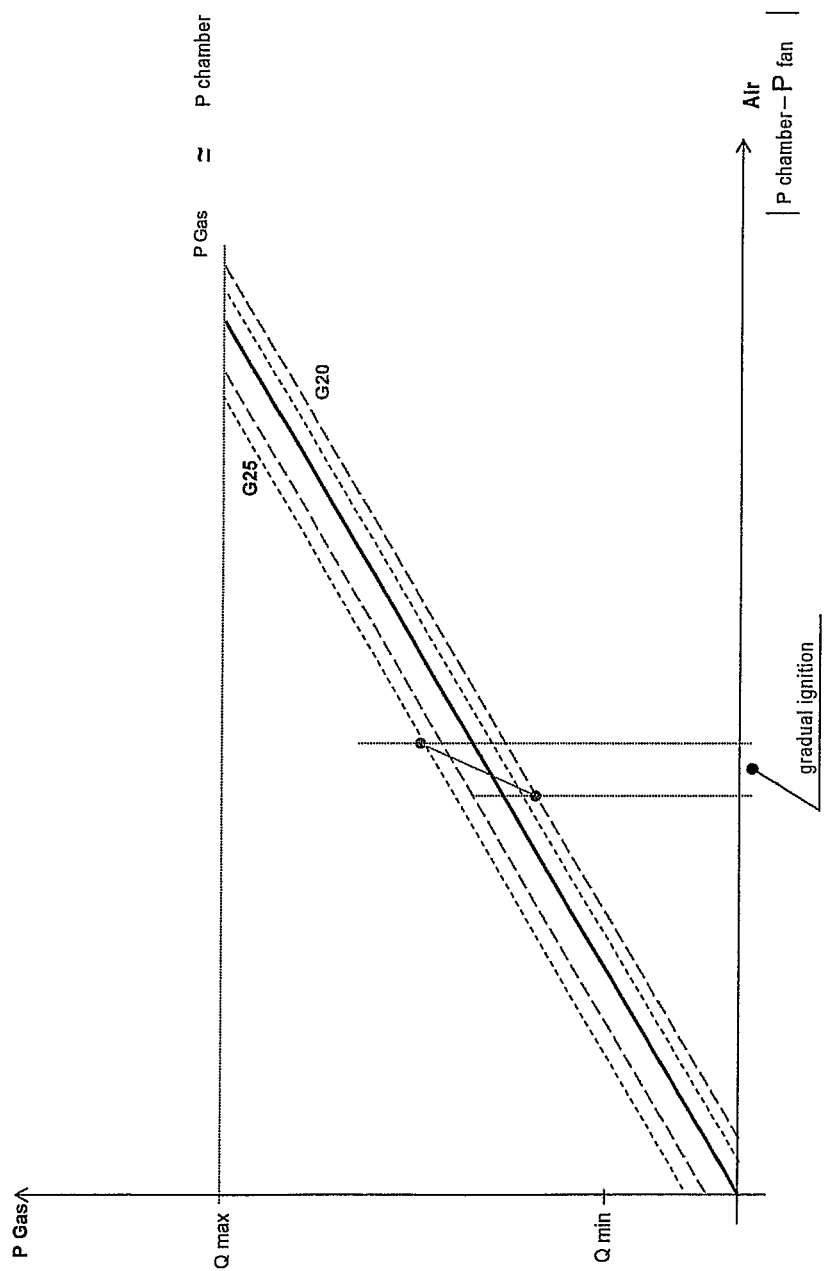
Figure 11:
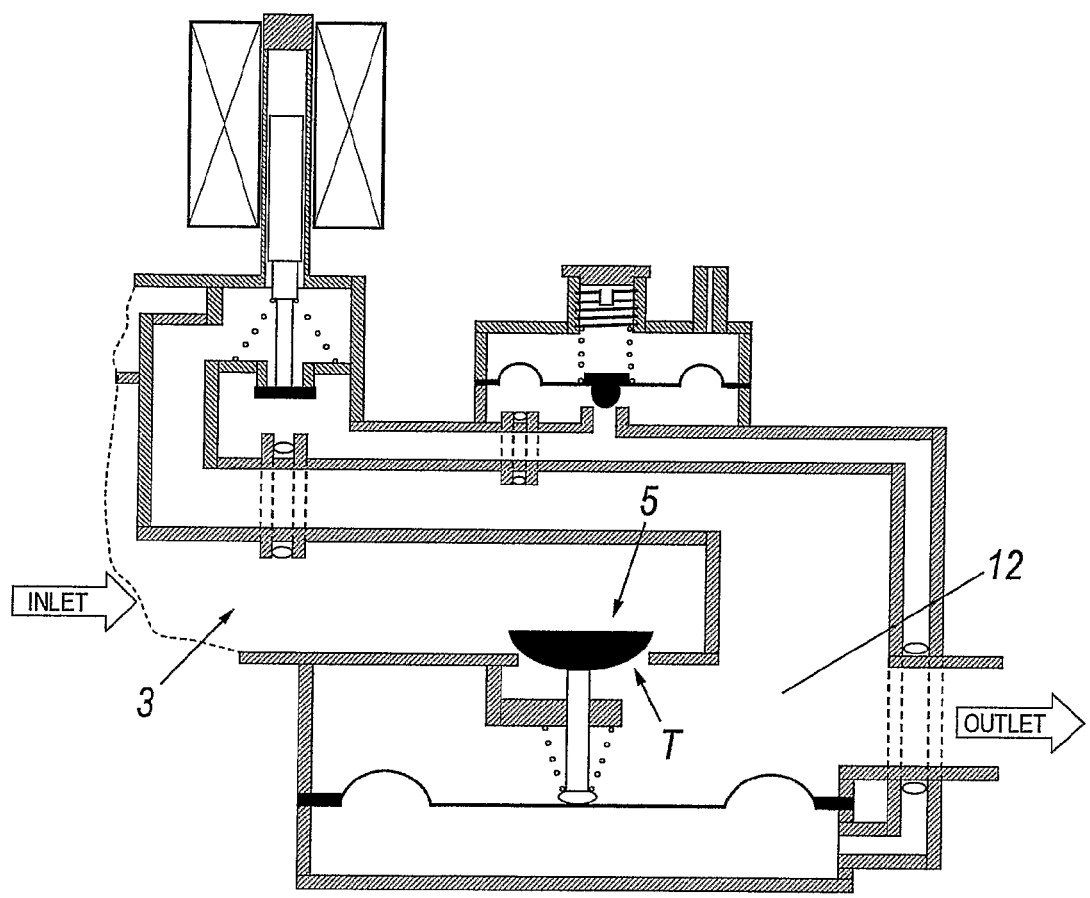
Figure 12:
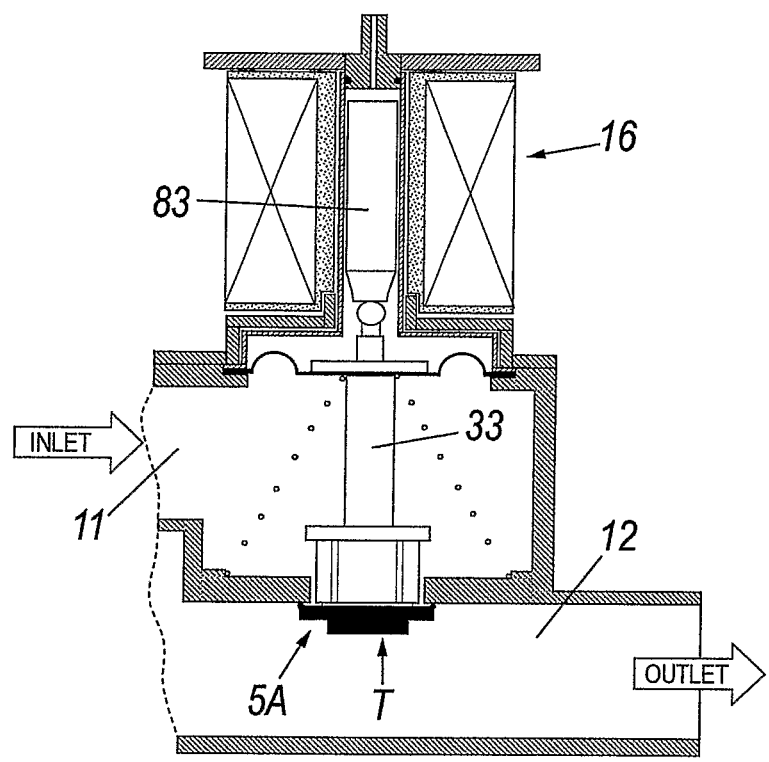

Figures from 4 to 8 show some schematic cross-sections, with certain parts omitted for greater clarity, through boilers to which a device of the invention is applied;

FIG. 9 shows a graph relative to the proportional characteristic between the air control pressure signal (Pu air) and the pressure of the gas (Pu gas) leaving the device of the invention;

FIG. 10 shows a graph relative to the proportional characteristic of the gas exit pressure and the difference Δ between the sealed chamber pressure and the fan pressure (governor zero);

FIG. 11 is a schematic section through a valve member of the state of the art during a malfunction stage of the boiler on which it is mounted; and FIG. 12 is a very schematic section through the valve member of the invention in the identical malfunction situation as the boiler of FIG. 11.

With reference to said figures, these show a multifunctional safety valve device 1 with an incorporated proportional pressure regulator, to be disposed in a line feeding an aeriform fluid, for example a gas such as methane, to a user (not shown), such as a boiler or other gas appliance. The device 1 of the invention comprises a body 2 provided with an internal conduit 3 and within which there are provided a first and a second valve member, or simply a valve, 4 and 5 provided with valving elements 4A, 5A respectively, to intercept corresponding passages 6 and 7 provided within walls or separator baffles 8, 9, respectively defining various chambers 10, 11, 12 connected together.

More specifically, the first valve 4 is an ON/OFF valve enabling the device 1 to be opened or closed and hence closing or allowing passage of gas (of whatever type, pure or mixed) towards the user. The second valve 5, instead, is a pressure regulator and modulator valve member of the gas flow rate towards the users. The corresponding valving elements 4A, 5A of said valves 4, 5 interrupt, allow or regulate gas flow depending on requirements, in the manner described hereinafter. The passage 3 is connected in known manner (for example by a ring nut connection) through the chamber 10 to a gas intake line (not shown) by a ring nut or similar coupling (not shown); this passage is connected in known manner via the chamber 12 to a delivery line (also not shown) for feeding the aeriform fluid to the user.

The body 2 of the regulator 1 comprises a first portion 17 presenting the aforesaid conduit 3, with said portion 17 there being associated in known manner (for example by screws 18) a second portion 19 in which electromagnetic actuators 15 and 16 for the valves 4 and 5 are disposed, to operate the valving elements 4A, 5A of these latter. Between the armour is surround 19 and the first portion 19 there are a seal element 20 (positioned at the actuator 15) and a flexible membrane 21 positioned at the (second) valve member 5.

More specifically, the first and second portion 17 and 19 of the body 2 comprise a plurality of members. The first portion 17 comprises a block 17A within which the conduit 3 is physically formed, and a lower plate 22 coupled to a substantially flat gasket 23; this lower plate and said gasket are clamped onto the block 17A by the screws 18. The block 17A also comprises a seat 25 for a usual filter 26.

The valving element 4A, 5A of each valve member 4, 5 cooperates with a corresponding spring 30, 31 such as to be urged into the closed position on the corresponding passage 6, 7 when the respective electromagnetic actuator 15, 16 is de-energized. In the embodiment of the figures, these springs are positioned facing the second portion 19 of the body 2. However, the spring 31 could also be located between the valving element 5A and the lower plate 22 which for this purpose presents a seat to partially receive said spring.

In the embodiment of the figures, the springs 30, 31 are positioned at apertures 28 and 29 which enable a movable part 32, 33 (secured to the respective valving element 4A, 5A) of a corresponding electromagnetic actuator 15, 16 to pass such as to enable it to cooperate with the corresponding valving element and move it when required to change the interception state of the corresponding aperture 6, 7.

The membrane 21 is associated with the movable part 33 and is positioned spaced from the valving element 5A. It has a surface 21A subjected to the pressure of the gas present in the chamber 11 (also containing the part 33) which is greater than the surface 5K of the valving element 5A subjected to the same pressure. This characteristic, together with the shape of the valving element 5A, enables the closed condition of the passage 7 to be maintained with absolute reliability when the actuator 16 is de-energized (or at rest).

More specifically, the valving element 5A comprises a body 35 in one piece or, as in the embodiment of the figures, in two portions 35A and 35B coupled together by stably inserting a projection 36 on the first portion 35A into a seat 37 in the second portion 35B. The first portion is also stably coupled, for example snap-coupled, to an end 38 of the movable part 33, said first portion 35A being in one piece or, as in the embodiment of the figures, presenting a separate perimetral seal element 40 projecting from it and cooperating by abutment with that edge 7A of the passage 7 facing the chamber 11 of the conduit 3.

The second portion 35B of the valving element 5A presents a flexible rim 42, for example obtained by frusto-conical shaping of said part, widening towards that edge 7B of the passage 7 facing the chamber 12 of the conduit 3. As in the figure, said flexible rim 42 can project perimetrally from the portion 35B spacing from the latter while keeping a generally conical course or shape. Said rim 42 is always urged to seal against the edge 7B of the passage 7 by virtue of the gas pressure acting on the membrane 21: as stated, the surface 21A of this latter is greater than that 5K of the valving element 5A, this causing the valving element to be urged, by the membrane rigid with the movable part 33, towards the chamber 11 to force the rim 42 against the part 35B on the edge 7B of the passage 7 and seal this latter.

Said characteristic results in a safety condition for the valve 5 which, even if the spring 31 should lose its elastic characteristics with time, would in any event remain sealedly closed against the passage 7 because of the simple pressure of the gas on the membrane.

In the embodiment of the figures, the spring 31 is a conical spring the narrow part 45 of which rests on a first collar 46 of the movable part 33 defining, with a second collar 46A spaced from the first, an annular seat 47 into which a central is part 48 of the membrane 21 is inserted. The wide part 49 of the spring 31 rests on the edge 7A of the passage 7 and preferably on an annular relief 50 provided on this latter.

By virtue of the particular shape of its parts, the unit formed by the valving element 5A, the movable part 33, the membrane 21 and the spring 31 can be preassembled prior to insertion into the block 17A via the aperture 29. This facilitates the mounting of this "actuator unit" into this latter, with positive effects in terms of time and cost of assembly of the device 1.

Pressure takeoff screws 56 are present in the upper side 55 of the block 17A to allow measurement of the pressure present in the entry and exit of the passage 3. A metal plate 60 is interposed on the upper side 55 of the block 17A between the portions 17 and 19 of the body 2, said plate 60 being fixed to the block 17A by screws 60K and presenting, at the actuators 15 and 16, holed raised collars 60A, 60B bounded by cylindrical collars 61 facing said actuators. At least in the case of the actuator 16 (but also present in the actuator 15 in the figures), said collar 61 rises to the outside of a tubular piece 65 presenting a flanged bent end 66 lying below the plate 60 and maintained in position as a result of the fixing between the portions 17 and 19 of the body 2. The tubular piece 65 rises within the corresponding electromagnetic actuator, and in particular in a tubular portion 68 of this latter supporting a usual electrical winding or solenoid 69 and having opposing end flat parts or flanges 70, 71. In the case of the actuator 16, the first part 70 is superposed on and in contact with the plate 60 (in the case of the actuator 15, the part 70 of the respective portion 68 is spaced therefrom and rests on the corresponding collar 61), while the second end part 71 is positioned above the portion 19 where it lies below a plate portion 74A forming part of a cover 74 for said portion 19. Further screws 75 clamp the body 76 of the portion 19 onto the portion 17, said body containing the electromagnetic actuators 15 and 16, the plate portion 74 being is disposed on it.

The body 76 presents a central portion 76K for receiving the electrical contacts 69K of the windings 69 and rigid with the portions 68 supporting these latter. The contacts 69K are also predefined and able to be easily inserted into the portion 76K to hence be easily connected to usual connectors for the electrical feed (controlled by a suitable microprocessor-programmable electronic card, not shown, of the control circuit for the said device 1). This constructional characteristic of the contacts 69K facilitates mounting of the part 19 of the device 1 containing the electromagnetic actuators 15, 16.

A fixed tube 77 is positioned about the tubular piece 65 associated with the actuator 16, within the portion 68 of this latter, and is interposed between said piece 65 and the plate portion 74 (the piece 65 and the fixed tube 77 are coaxial within the actuator 16).

Inside the piece 65 there is provided in both the actuators 15, 16 an elongated movable core or member 82, 83 of the corresponding actuator: the core 82 is integral with the part 32 secured to the valving element 4A, while the core 83 is connected to the part 33, which is defined by an independent elongated piece fixed to said core in any known manner.

More specifically, the core 83 presents an end portion 89 to which the free end 90 of the part 33 is coupled, the end portion 89 of the core 83 being shaped specifically to maintain the action of the valving element 5A on the passage 7 constant even if the spring 31 modifies its action on said member or valve 5 with time. This end portion is disposed within the actuator 16 in a position such as to closely approach or at the most reach the upper end 61K of the collar 61. In this manner, the electromagnetic actuator presents a force/displacement characteristic which remains constant with time.

The end part 89 of the core 83 is of double cone shape, i.e. presenting two consecutive portions 89A, 89B with different sections, the actual end portion 89B being narrower than the portion 89A which precedes along the longitudinal axis of the core. This end part could however also be \ of other than double cone shape, but still present at least two portions consecutive along the longitudinal axis of the core having different sections (for example cylindrical), the actual end portion being of smaller section than the preceding portion along that axis. A mixed solution is also possible with an end part 89 having consecutive cylindrical and conical portions or vice versa.

Because of the form of the end part 89 and the presence of the collar 61 a magnetic field is created of such intensity as to always ensure that the core 83 is located in a prefixed position enabling desired operation of the actuator 16 for the required control of the valving element 5A.

If the pressure of the mains gas entering the valve device increases, the valving element 5A tends to close the passage 7, but not sufficiently to ensure correct exit pressure (the exit pressure increases).

Because of the shape of the part 89 of the core 83, without making any correction in the feed current to the actuator 16, the effect of the force/displacement characteristic of the core 83 is that the force of this latter decreases and the valving element 5A further closes the passage 7 to ensure correct exit pressure even if the entry pressure increases.

If the pressure of the mains gas entering the valve device decreases, the valving element 5A tends to open the passage 7, but not sufficiently to ensure correct exit pressure (the exit pressure decreases).

Because of the shape of the portion 89 of the core 83, without making any correction in the feed current to the actuator 16, the effect of the force/displacement characteristic of the core 83 is that the force of this latter on the valving element 5A further opens the passage 7 to ensure correct exit pressure even if the entry pressure decreases.

The core moves within a chamber 100 of the actuator 16 which is closed upperly by a cap 106 provided with a sized hole 107 for venting air and any gas which has passed beyond the membrane 21 (should this break) and into the chamber 100. This hole 107 can also be connected to a known tube 200 (see FIGS. 4-8) opening into the sealed chamber 201 of a gas appliance 300 with which the invention is associated, to compensate the pressure exerted on that side of the membrane 21 facing the chamber 100 and allow optimal control of the exit pressure.

Figure 4:
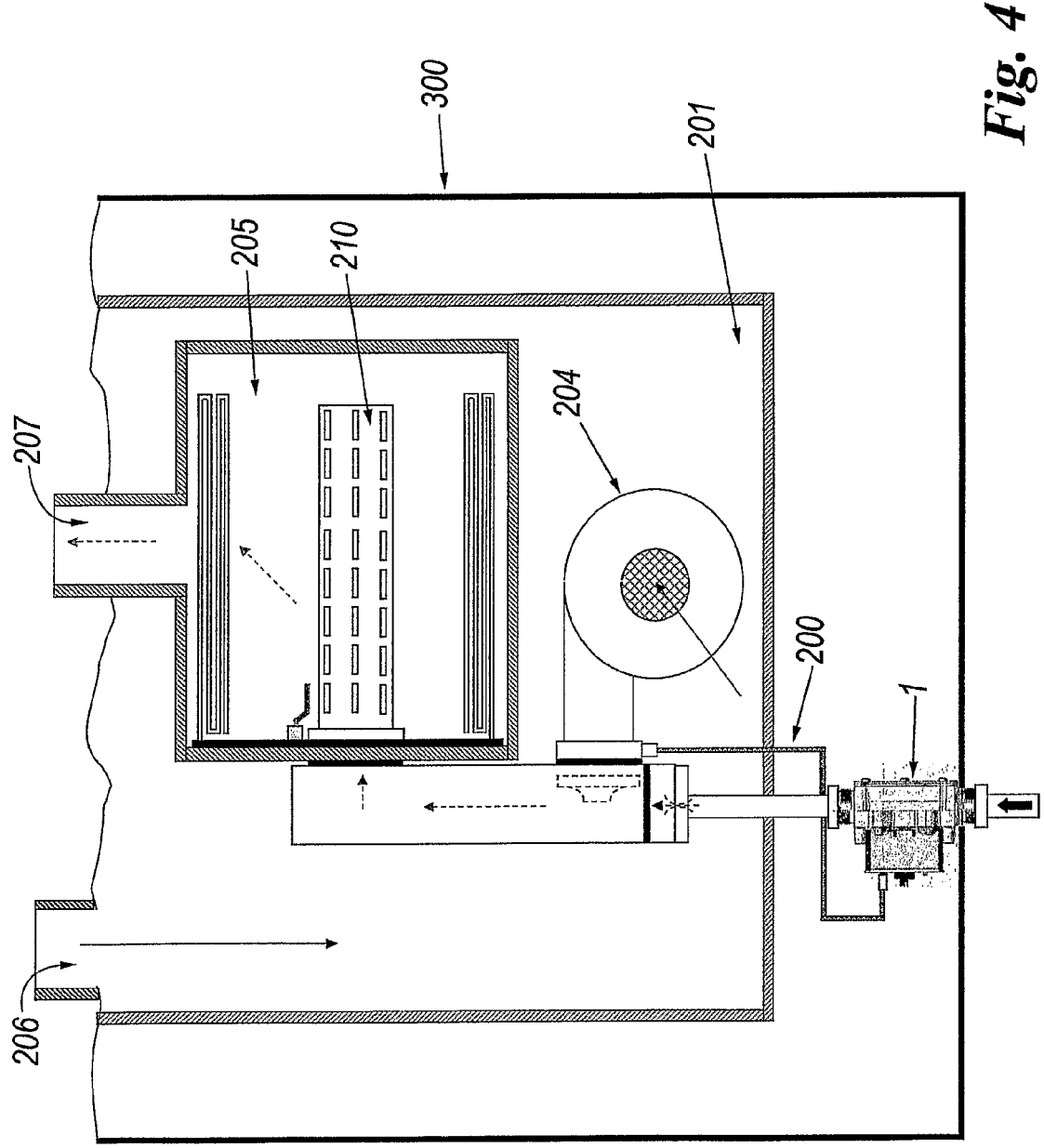

FIG. 4 shows a premix condensation boiler with pressure mixing. It comprises, among other components, a fan 204, as combustion chamber 205, a burner 210 located therein, an air entry conduit 206 and a flue gas discharge conduit 207.

In the case of a boiler equipped with such a premix burner with pressure mixing (see FIG. 4), the device of the invention is controlled with almost constant current, the gas exit pressure to the burner 210 being controlled by a pneumatic signal acquired via the tube 200 connected to the takeoff of the fan 204.

Minimal current corrections can be made to adapt the exit pressures to various types of gas (pertaining to the same family, e.g. from G20 to G25 as shown in FIG. 9 in which the straight lines define various types of gas) and hence optimise combustion.

Should the flue gas discharge 207 be closed, the absolute pressure increases and the pressure difference goes to zero.

Under these conditions, at the pre-ventilation stage, in a known valve member shown schematically in FIG. 11, the closure force on the valving element 5A is reduced (see FIG. 11). This is because of the presence of an air pressure originating from the delivery line, this pressure being indicated by the arrow T in FIG. 11. In this latter figure, parts corresponding (from the functionality viewpoint) to those of the figures relative to the invention carry the same reference numerals for descriptive simplicity.

In the device of the invention, under these conditions the closure force on the valving element 5A increases (by the air pressure indicated by the arrow T), to always maintain the plant safe (see FIG. 12).

Figure 5:
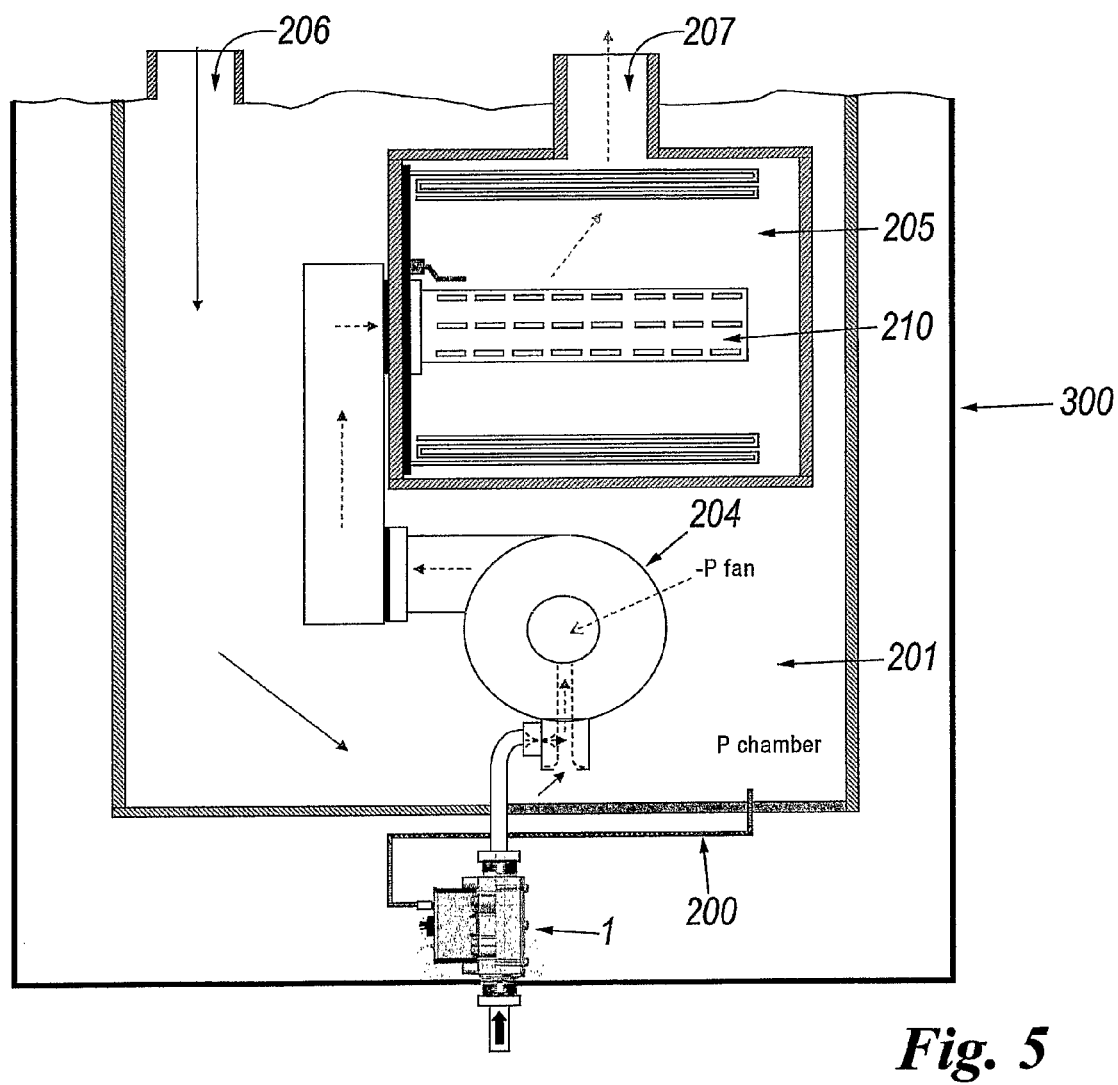

In the case of boilers equipped with a premix burner with vacuum mixing (of which one example is shown in FIG. 5), the device 1 is controlled with almost constant current, the gas exit pressure to the burner 210 being controlled by the signal acquired via the tube 200 connected to the sealed chamber of the appliance (zero governor); minimal current corrections can also be made to adapt the exit pressures to various types of gas (pertaining to the same family, e.g. from G20 to G25 as shown in FIG. 10) and hence optimise combustion.

Figure 6:
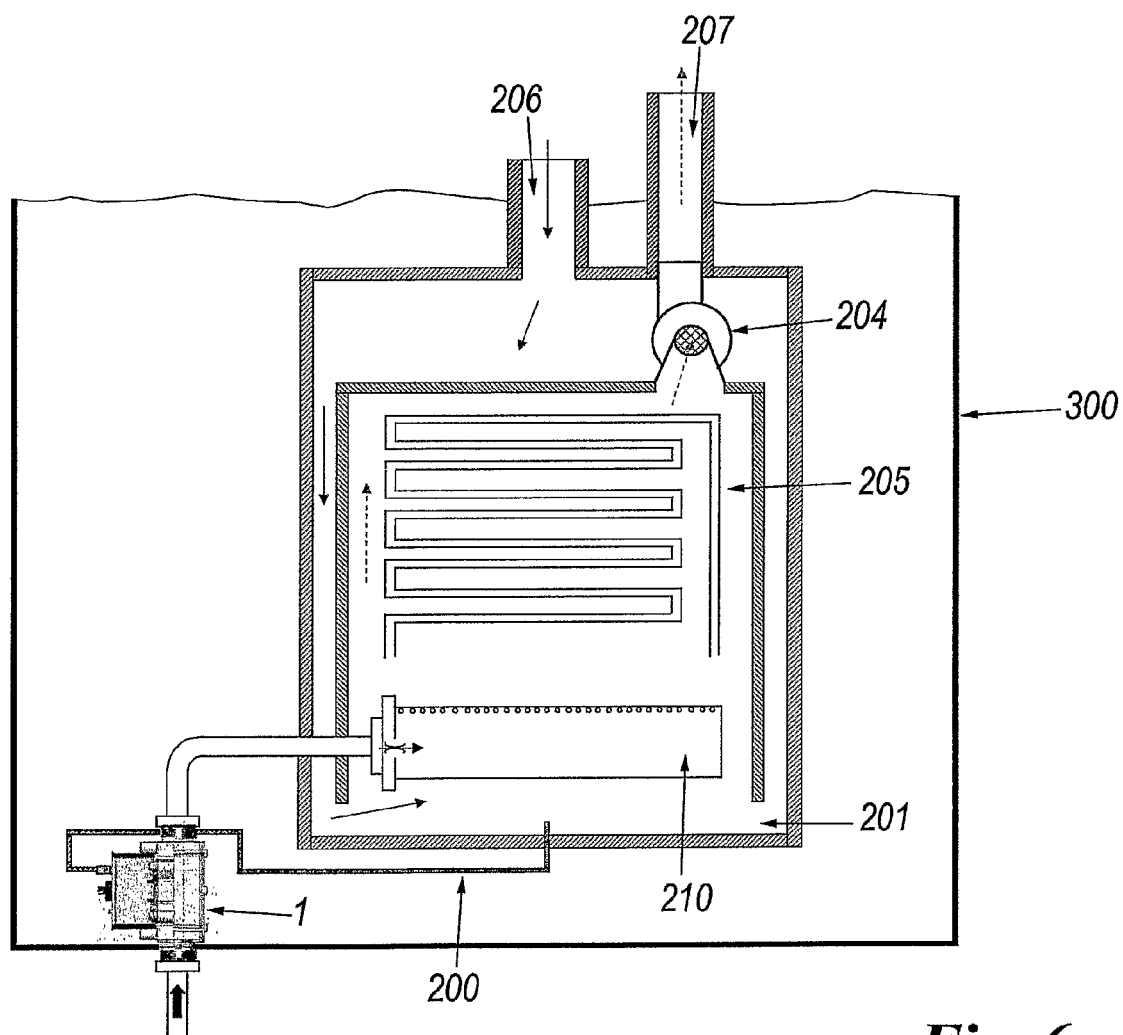
Figure 7:
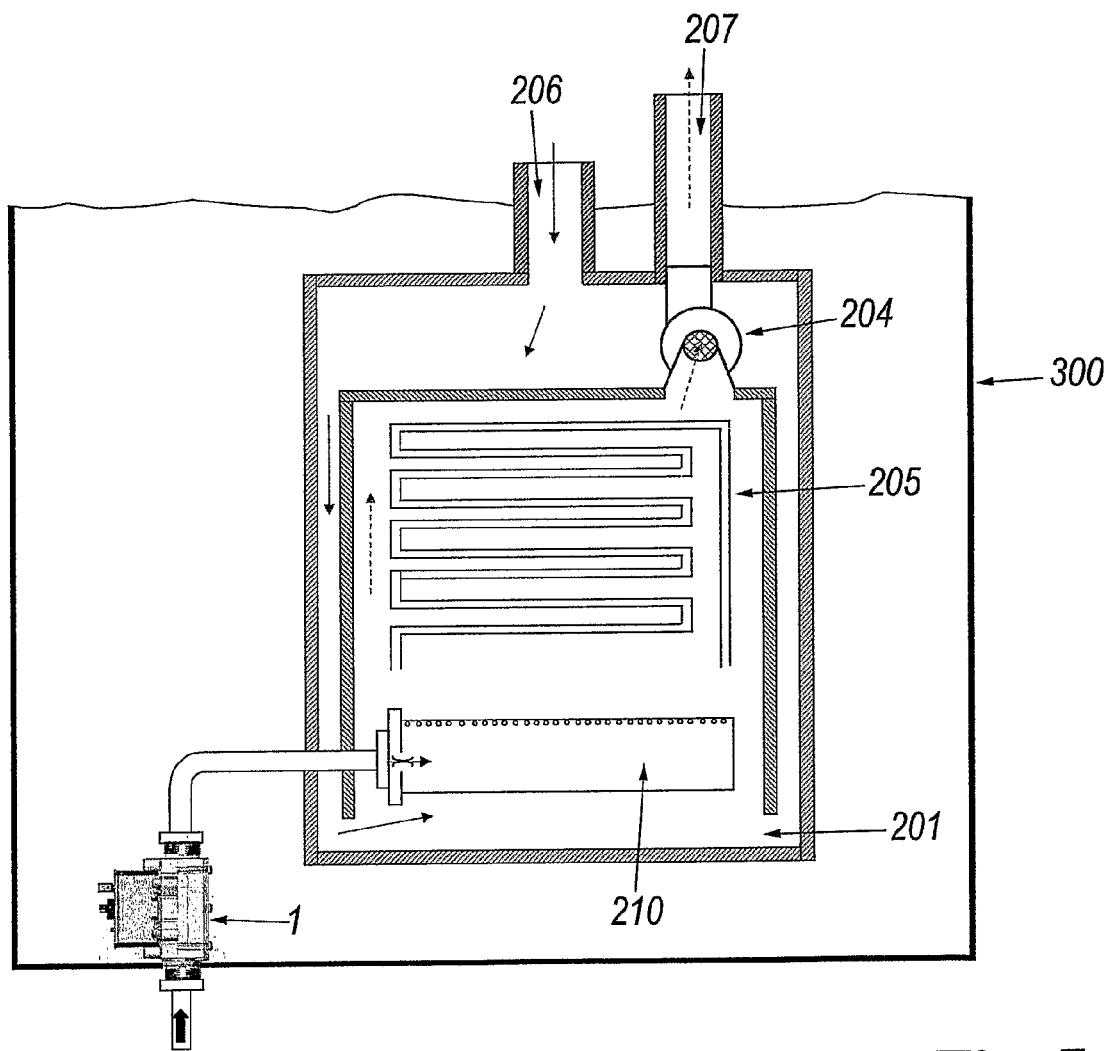
Figure 8:
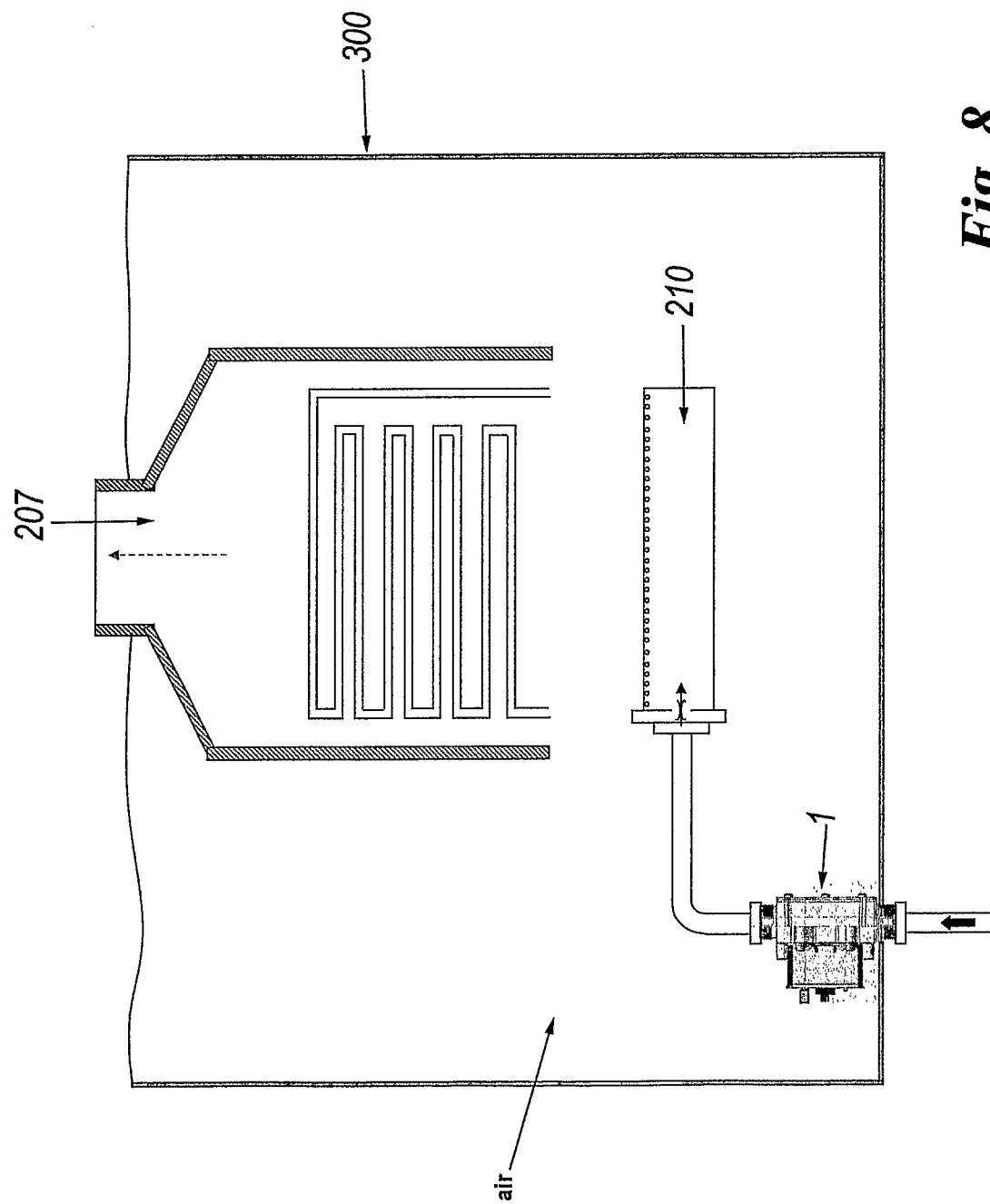

Other types of application of the device 1 are described schematically in FIGS. 6, 7 and 8 showing respectively a sealed chamber boiler with compensation takeoff (FIG. 6), a sealed chamber boiler (FIG. 7) and an open chamber boiler (FIG. 8). In these figures, parts corresponding to those of the previous figures are indicated by the same reference numerals.

Figure 1A:
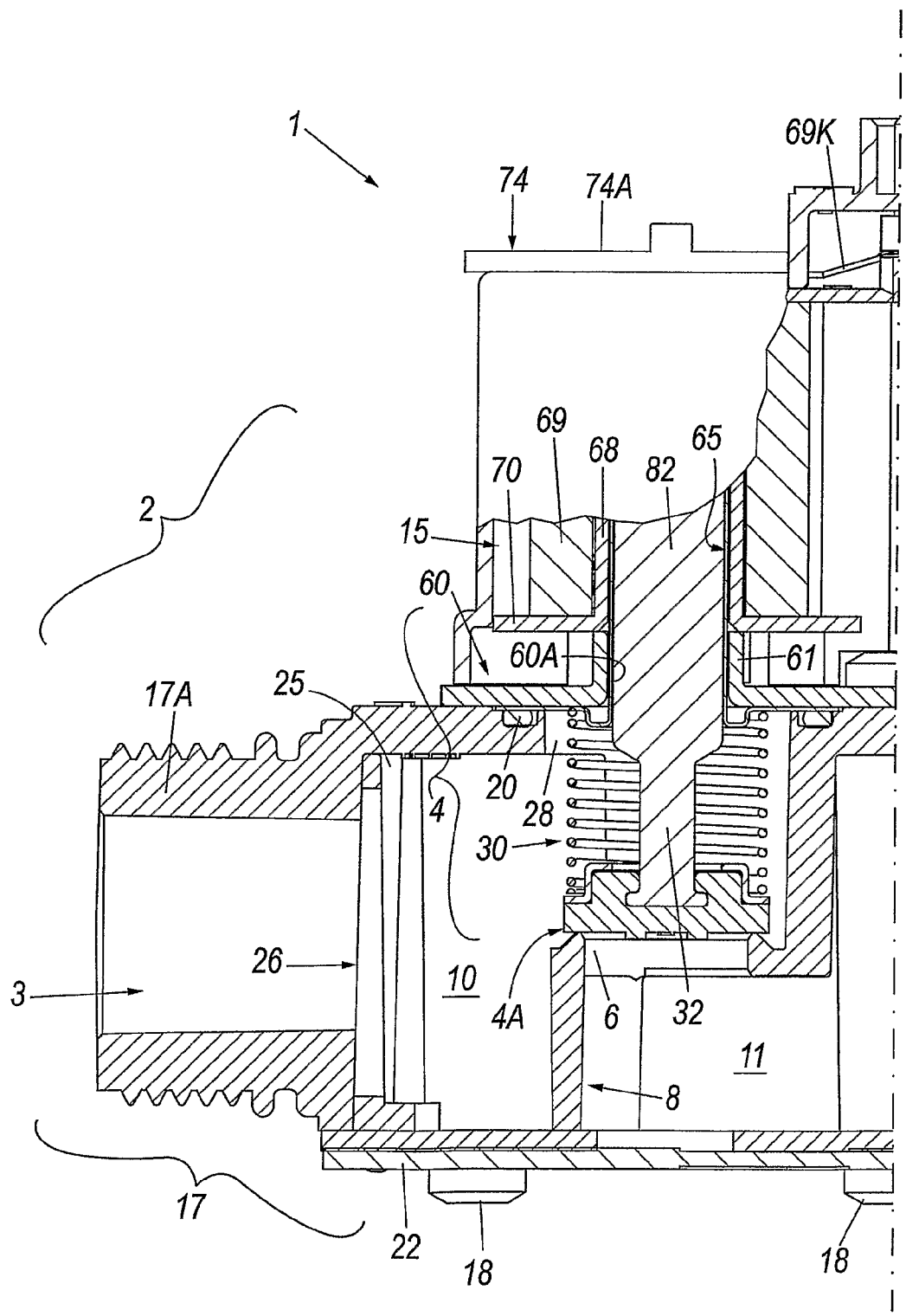
FIGS. 1A and 1B show, in two parts, a cross-section through a regulator obtained in accordance with the invention, said cross-section being indicated in the present text as overall defining "FIG. 1" of the patent text.
Figure 1B:
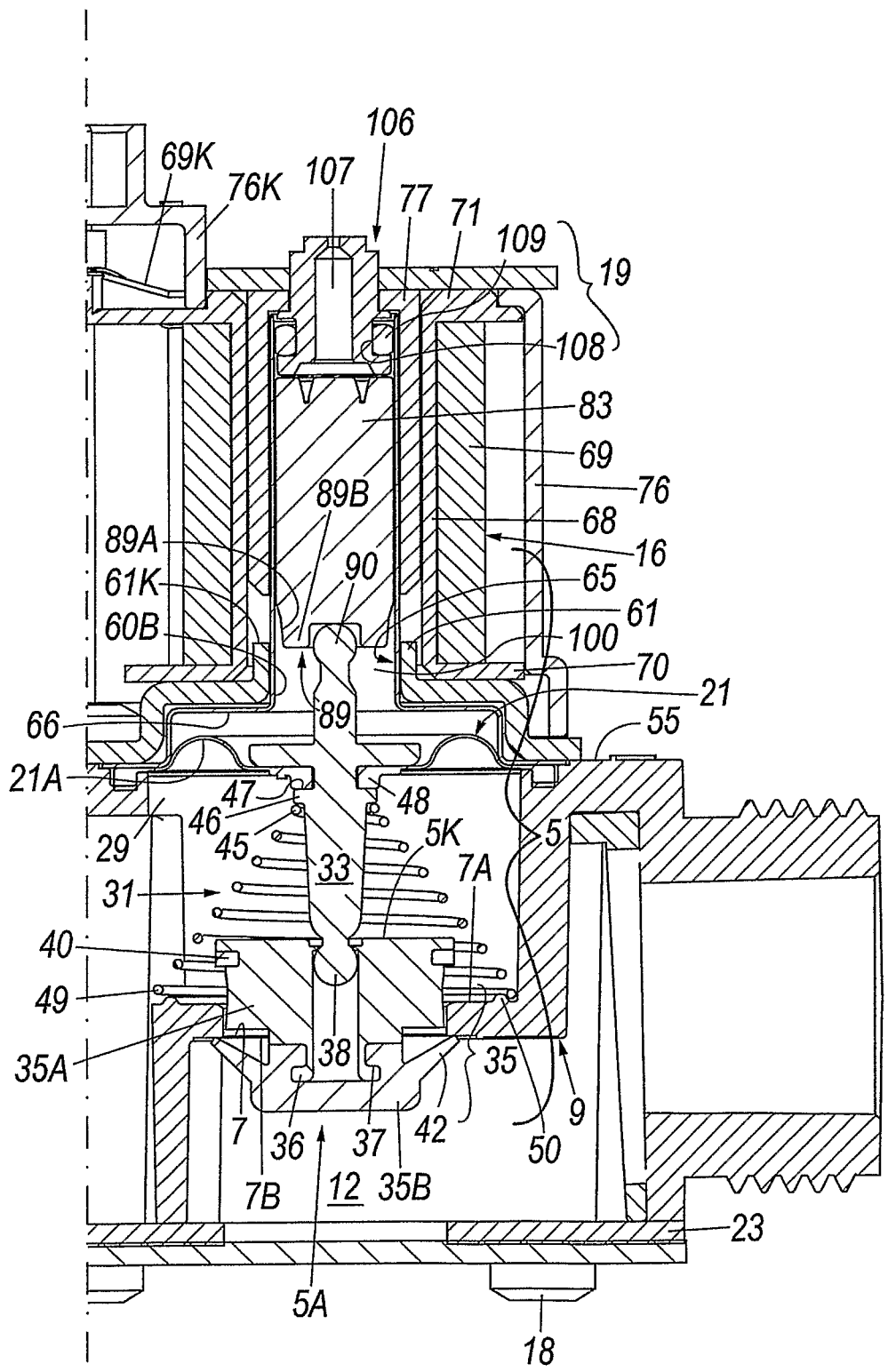
Figure 2:
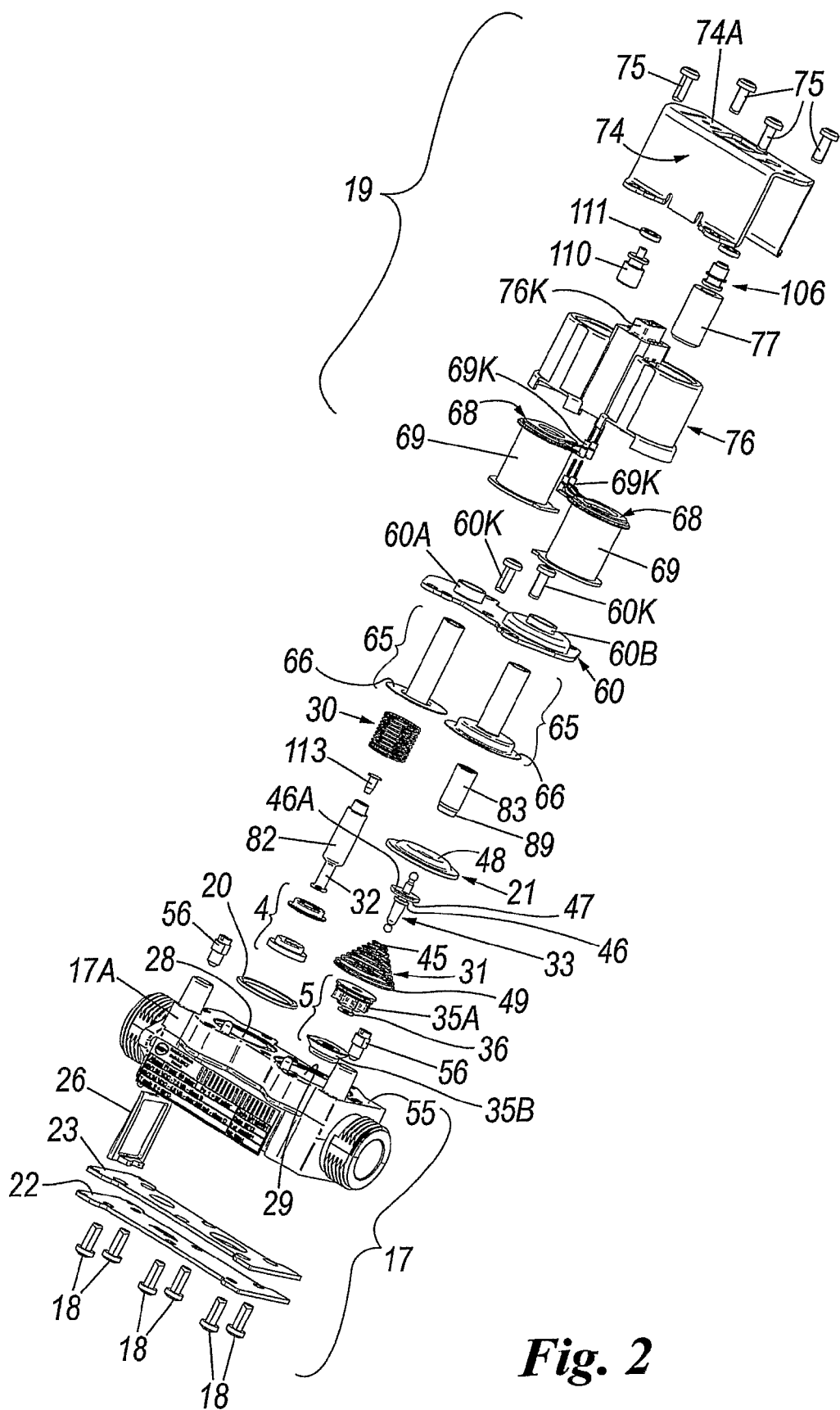
FIG. 2 is an exploded view of the regulator of FIG. 1.

Returning to FIGS. 1 and 2, these show that the cap 106 presents a side recess 108 housing a seal element 109 acting on the tubular element 65.

A similar cap 110 provided with a seal ring 111 closes the chamber within which the core 82 of the actuator 15 moves, with this latter there being associated a damping element 113 of known type.

A multifunctional safety valve device with incorporated portion formed in accordance with the present invention ensures regular and constant gas flow independently of inlet pressure variation. The regulator is formed from parts which fit together in such a manner as to facilitate assembly, making this operation rapid and of low cost. The device offers high reliability and safety in use in that, even if the membrane 21 or spring 31 should break, the valving element 5A is thrust onto the passage 7A both during starting and during normal operation, to close the passage with its portion 35A. This always ensures safety of the gas appliance with which the device 1 is associated.

Figure 3:
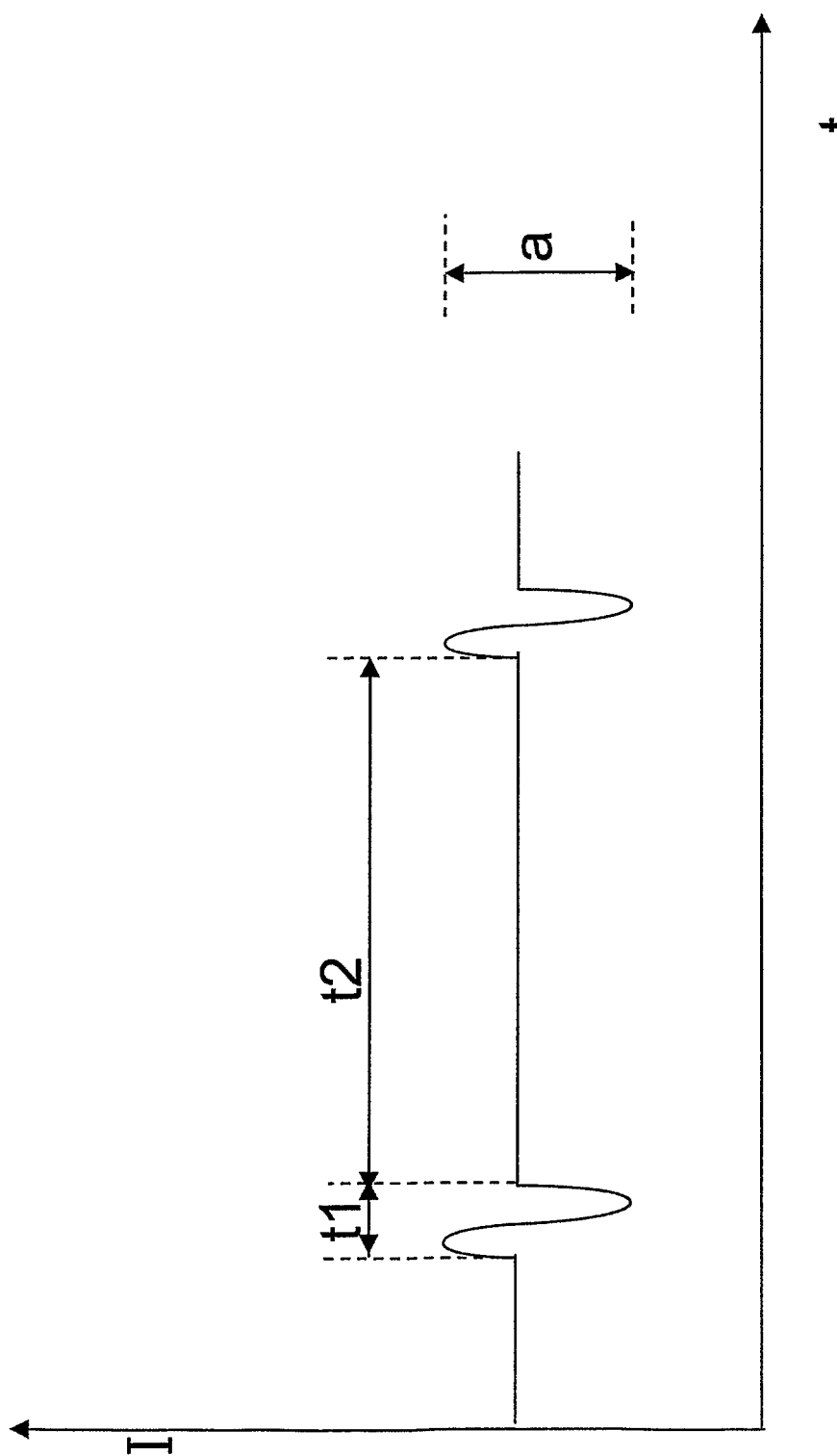
FIG. 3 shows a time/current electrical feed graph indicating the manner of feeding current to the valve member operating as a pressure regulator and modulator.

Moreover, the device 1 does not have a bypass conduit for the valving element 5A (so simplifying the construction of the block 17A), minimum gas flow being achieved by suitably controlling the actuator 16 and by virtue of the aforedescribed shape of the portion 89 of its core 83 and of the collar 61. Specifically, with reference to FIG. 3, control takes place by introducing into the controlling current signal (direct current) for the winding or solenoid 69 of this actuator 16 an upward or downward current variation to this signal of defined amplitude "a" and of predefined duration "t1" and distanced in time by a defined period "t2". These time values (t1, t2) and amplitude "a" depend on the type of appliance on which the device 1 is mounted and on the regulation to be effected with the valving element 5A.

This method of operation reduces the effects of the currently used control method of superimposing a continuous alternating current signal on the direct current control signal, these effects leading to exit pressure fluctuation and lack of stability, vibration of the core 83 and noise generation by this vibration. These effects are overcome and nullified by the control method of the present invention.

A preferred embodiment of the invention has been described, but others can be deduced from the present document by the expert of the art, and are therefore to be considered as falling within the scope of the following claims.

The invention claimed is:

1. A multifunctional safety valve device with an incorporated proportional pressure regulator, to be used in a line feeding an aeriform fluid to a user, said device comprising
   a regulator body in which a conduit for said fluid or gas is defined, a first valve member, a second valve member, electromagnetic actuators, and a membrane;
   said conduit for being connected to a gas feed line and to a line for delivering the gas to the user,
   said conduit comprising a first passage to be intercepted by a first valving element of the first valve member and a second passage to be intercepted or selectively restricted by second valving element of the second valve member, positioned downstream of the first valving element, to act as a gas pressure regulator and modulator,
   said valving elements being operated by corresponding said electromagnetic actuators and urged into closed position, in which they intercept the respective passages, at least by a corresponding spring,
   the second valving element cooperating with the membrane subjected to the gas pressure to urge said second valving element into the closed position,
   wherein the membrane has a surface subjected to the pressure of the gas moving towards said second valve member which is greater than the surface of the second valving element subjected to the same gas pressure, to hence maintain the second valving element closed, this second valving element presenting, downstream of the second passage, said second valving element comprising a first portion positioned within a first of said chambers and a second portion positioned within a second of said chambers downstream of the first chamber and for being connected to the line for delivering gas,
   the second portion arranged to sealedly close this second passage when intercepted by the second valving element,
   wherein the passage on which the second valving element of the second valve member is positioned divides the conduit of the device body into two adjacent consecutive chambers,
   said second portion presenting a flexible rim and the first portion presenting the surface subjected to gas pressure also acting on the membrane, said first portion being arranged to close onto an edge of the passage facing the first chamber,
   comprising means for compensating the action of the electromagnetic actuator of the second valve member on the basis of the thrust exerted by the spring on the corresponding valving element, said means allowing any variation in the spring thrust force to be compensated to maintain the gas flow regulating action by the regulator constant with time,
   wherein a profiled end portion of a core is present, in an actuator chamber containing said core, in a position corresponding with a cylindrical element inserted into and fixed in said actuator chamber, said profiled end portion being close to or at most disposed in correspondence with the end of said element present in said actuator chamber when the second valve member is in its closed position, wherein the actuator chamber within which the core of the electromagnetic actuator of the second valve member moves has an open upper end which is sealedly closed by a cap with a through hole, wherein said cap is connected to an air takeoff connected to the sealed chamber of the gas appliance or to a takeoff on a fan to which said device is connected.

2. The device as claimed in claim 1, wherein the valving element of said second valve member is one piece.

3. The device as claimed in claim 1, wherein the valving element comprises two physically separate portions stably coupled together.

4. The device as claimed in claim 1, wherein the body presents a first and a second portion joined together, the gas conduit being provided in the first portion, between said portions a metal plate being present comprising a cylindrical element inserted into a chamber within which a core of the actuator of the second valve member moves, said cylindrical element being a collar projecting upwards from said plate.

5. The device as claimed in claim 1, wherein the first portion of the second valving element is one piece.

6. The device as claimed in claim 1, wherein said profiled end portion comprises at least two successive portions of different transverse cross section, a lower cross section being that of the portion, of said at least two successive portions, at or closest to an end of the core.

7. The device as claimed in claim 6, wherein a first successive section is constant and the second successive section varies along a longitudinal axis of the profiled end portion of the core.

8. The device as claimed in claim 1, wherein the movable core of the electromagnetic actuator of the second valve member is coupled to support means for the valving element of said member, the membrane subjected to the gas pressure also being associated with said support means.

9. The device as claimed in claim 8, wherein said support means are an element presenting a first end coupled to the valving element of the second valve member and carrying, in proximity to a second end associated with the core of the electromagnetic actuator, said membrane, the corresponding spring being present between this membrane and said valving element, said element, the membrane, the spring and said valving element forming a pre-assembled unit to be inserted into the device body.

10. The device as claimed in claim 1, wherein each electromagnetic actuator comprises an electrical winding or coil positioned about a tubular portion presenting flanged end parts, said tubular portion containing a tubular piece, the electromagnetic actuators being contained within a actuator housing which can be pre-assembled with the actuators.

11. The device as claimed in claim 10, wherein a fixed tube is present between said tubular portion and said tubular piece, said tube being spaced axially from said cylindrical element along said chamber within which the core of the electromagnetic actuator of the second valve member moves.

12. The device as claimed in claim 10, wherein the actuator housing containing the electromagnetic actuators is closed by a cover of the second portion of the regulator body.

13. The device as claimed in claim 1, wherein said second portion comprises the flexible rim having an outer surface which is frusto-conical in shape.

14. The device as claimed in claim 13, wherein the flexible rim having frusto-conical shape cooperates with the edge of the passage facing the second chamber.

15. The device as claimed in claim 14, wherein said rim projects perimetrally from the second portion of said valving element and separates from the second portion.

16. The device as claimed in claim 14, wherein a cylindrical element is disposed about a tubular piece inserted into said actuator of the second valve member and defines a chamber for the movement of a core of said electromagnetic actuator, said tubular piece presenting a flanged end lying between a metal plate and the first portion of the body of the regulator.

17. A multifunctional safety valve device with an incorporated proportional pressure regulator, to be used in a line feeding an aeriform fluid to a user, said device comprising
a regulator body in which a conduit for said fluid or gas is defined, a first valve member, a second valve member, electromagnetic actuators, and a membrane;
said conduit for being connected to a gas feed line and to a line for delivering the gas to the user,
said conduit comprising a first passage to be intercepted by a first valving element of the first valve member and a second passage to be intercepted or selectively restricted by second valving element of the second valve member, positioned downstream of the first valving element, to act as a gas pressure regulator and modulator,
said valving elements being operated by corresponding said electromagnetic actuators and urged into closed position, in which they intercept the respective passages, at least by a corresponding spring,
the second valving element cooperating with the membrane subjected to the gas pressure to urge said second valving element into the closed position,
wherein the membrane has a surface subjected to the pressure of the gas moving towards said second valve member which is greater than the surface of the second valving element subjected to the same gas pressure, to hence maintain the second valving element closed, this second valving element presenting, downstream of the second passage, said second valving element comprising a first portion positioned within a first of said chambers and a second portion positioned within a second of said chambers downstream of the first chamber and for being connected to the line for delivering gas,
the second portion arranged to sealedly close this second passage when intercepted by the second valving element;
wherein the passage on which the second valving element of the second valve member is positioned divides the conduit of the device body into two adjacent consecutive chambers,
said second portion presenting a flexible rim and the first portion presenting the surface subjected to gas pressure also acting on the membrane, said first portion being arranged to close onto an edge of the passage facing the first chamber;
wherein the first portion of the second valving element comprises a perimetral seal element projecting from the second valving element and cooperating by abutment with the edge of the passage facing the chamber of the conduit on which the second valving element is positioned.

18. The device as claimed in claim 17, wherein said second portion comprises the flexible rim having an outer surface which is frusto-conical in shape.

19. The device as claimed in claim 17, comprising means for compensating the action of the electromagnetic actuator of the second valve member on the basis of the thrust exerted by the spring on the corresponding valving element, said means allowing any variation in the spring thrust force to be compensated to maintain the gas flow regulating action by the regulator constant with time.

20. The device as claimed in claim 19, wherein the means for compensating comprise a profiled end portion of a movable core of said electromagnetic actuator of the second valve member.

21. The device as claimed in claim 20, wherein said profiled end portion comprises at least two successive portions of different transverse cross section, a lower cross section being that of the portion, of said at least two successive portions, at or closest to an end of the core.

22. The device as claimed in claim 21, wherein a first successive section is constant and the second successive section varies along a longitudinal axis of the profiled end portion of the core.

23. The device as claimed in claim 20, wherein the movable core of the electromagnetic actuator of the second valve member is coupled to support means for the valving element of said member, the membrane subjected to the gas pressure also being associated with said support means.

24. The device as claimed in claim 23, wherein said support means are an element presenting a first end coupled to the valving element of the second valve member and carrying, in proximity to a second end associated with the core of the electromagnetic actuator, said membrane, the corresponding spring being present between this membrane and said valving element, said element, the membrane, the spring and said valving element forming a pre-assembled unit to be inserted into the device body.

25. The device as claimed in claim 20, wherein said profiled end portion of the core is present, in an actuator chamber containing said core, in a position corresponding with a cylindrical element inserted into and fixed in said actuator chamber, said profiled end portion being close to or at most disposed in correspondence with the end of said element present in said actuator chamber when the second valve member is in its closed position.

26. The device as claimed in claim 25, wherein the actuator chamber within which the core of the electromagnetic actuator of the second valve member moves has an open upper end which is sealedly closed by a cap with a through hole.

* * * * *